United States Patent
Jackson et al.

(10) Patent No.: US 8,879,545 B2
(45) Date of Patent: Nov. 4, 2014

(54) METHODS AND APPARATUS TO ROUTE A COMMUNICATION SESSION DIRECTLY TO A VOICEMAIL MAILBOX

(75) Inventors: James Jackson, Austin, TX (US); Niral Sheth, Austin, TX (US); Mehrad Yasrebi, Austin, TX (US)

(73) Assignee: AT&T Intelletual Property I, L.P., Atlanta, GA (US)

( * ) Notice: Subject to any disclaimer, the term of this patent is extended or adjusted under 35 U.S.C. 154(b) by 1495 days.

(21) Appl. No.: 11/967,755

(22) Filed: Dec. 31, 2007

(65) Prior Publication Data

US 2009/0168986 A1 Jul. 2, 2009

(51) Int. Cl.
| | |
|---|---|
| H04L 12/66 | (2006.01) |
| H04M 3/42 | (2006.01) |
| H04M 11/10 | (2006.01) |
| H04M 3/54 | (2006.01) |
| H04L 29/06 | (2006.01) |
| H04M 3/533 | (2006.01) |
| H04M 7/12 | (2006.01) |
| H04M 7/00 | (2006.01) |

(52) U.S. Cl.
CPC ........ *H04M 3/54* (2013.01); *H04M 2203/4545* (2013.01); *H04L 29/0638* (2013.01); *H04M 2203/1008* (2013.01); *H04M 3/53316* (2013.01); *H04M 3/533* (2013.01); *H04M 7/127* (2013.01); *H04M 3/42076* (2013.01); *H04M 7/006* (2013.01); *H04M 3/53308* (2013.01)
USPC ........... 370/354; 370/353; 370/355; 370/356; 379/201.01; 379/211.01; 379/211.02; 455/412.1; 455/412.2; 455/413

(58) Field of Classification Search
CPC ..................... H04M 3/42076; H04M 3/53308; H04M 3/53316; H04M 7/127; H04M 2203/4545; H04L 29/0638
USPC ................ 370/352–356; 379/201.01, 211.01, 379/211.02; 455/412.1, 412.2, 413
See application file for complete search history.

(56) References Cited

U.S. PATENT DOCUMENTS

| | | | |
|---|---|---|---|
| 6,131,095 | A | 10/2000 | Low et al. |
| 6,466,570 | B1 | 10/2002 | Low et al. |

(Continued)

FOREIGN PATENT DOCUMENTS

| | | |
|---|---|---|
| AU | 704385 | 7/1997 |
| EP | 0732858 | 9/1996 |

(Continued)

OTHER PUBLICATIONS

Rosenberg, et al. "Caller Preferences for the Session Initiation Protocol (SIP)," The Internet Society, (Aug. 2004), 22 pages.

(Continued)

*Primary Examiner* — Luat Phung
*Assistant Examiner* — Kai Chang
(74) *Attorney, Agent, or Firm* — Hanley, Flight & Zimmerman, LLC

(57) ABSTRACT

Methods and apparatus to route a communication session directly to a voicemail mailbox are disclosed. An example method includes receiving a communication session initiation message from a caller at a source telephone number, the communication session initiation message including a destination telephone number and a direct voicemail feature identifier, determining that the direct voicemail feature identifier indicates that the caller requests that the call be sent to a voicemail mailbox associated with the destination telephone number, and forwarding the call directly to the voicemail mailbox associated with the destination telephone number without ringing the destination telephone number.

18 Claims, 5 Drawing Sheets

(56) References Cited

U.S. PATENT DOCUMENTS

| | | | |
|---|---|---|---|
| 6,711,243 B1* | 3/2004 | Holt | 379/88.26 |
| 6,947,738 B2 | 9/2005 | Skog et al. | |
| 6,968,050 B1* | 11/2005 | Pershan et al. | 379/196 |
| 7,012,916 B2 | 3/2006 | Low et al. | |
| 7,013,155 B1 | 3/2006 | Ruf et al. | |
| 7,079,630 B2 | 7/2006 | Green et al. | |
| 7,133,687 B1 | 11/2006 | El-Fishawy et al. | |
| 7,206,304 B2 | 4/2007 | Low et al. | |
| 7,260,384 B2* | 8/2007 | Bales et al. | 455/413 |
| 7,945,029 B1* | 5/2011 | Wageman | 379/88.25 |
| 2002/0107003 A1* | 8/2002 | Martin et al. | 455/412 |
| 2005/0059384 A1* | 3/2005 | Kuusinen et al. | 455/414.1 |
| 2005/0141491 A1 | 6/2005 | Low et al. | |
| 2005/0157704 A1* | 7/2005 | Lim | 370/352 |
| 2005/0287993 A1 | 12/2005 | Gogic | |
| 2007/0064886 A1 | 3/2007 | Chiu | |
| 2007/0071221 A1 | 3/2007 | Allen | |
| 2007/0076687 A1 | 4/2007 | Low et al. | |
| 2007/0087730 A1 | 4/2007 | Diroo | |
| 2007/0104184 A1* | 5/2007 | Ku et al. | 370/352 |
| 2007/0121885 A1 | 5/2007 | Sin | |
| 2008/0084980 A1* | 4/2008 | Florkey et al. | 379/201.01 |
| 2008/0263212 A1* | 10/2008 | Goix et al. | 709/228 |
| 2009/0319686 A1* | 12/2009 | Watanabe | 709/240 |

FOREIGN PATENT DOCUMENTS

| | | |
|---|---|---|
| EP | 0736442 | 10/1996 |
| GB | 1207703 | 10/1970 |
| GB | 1207704 | 10/1970 |
| JP | 4159603 | 6/1992 |
| WO | 9731490 | 8/1997 |

OTHER PUBLICATIONS

Vaudreuil, G. and Parsons, G. "Voice Profile for Internet Mail—Version 2 (VPIMv2)," The Internet Society, (Jun. 2004), 45 pages.

Selected messages from "Enum Discussion Archive," The Internet Engineering Task Force, discussion initiated by James Jackson on Jan. 28, 2007, discussion posts 05480-05487, 05489-05503, 05505-05511, 05523, 05530, 05558, 05559, 05562, and 05565 dated from Jan. 28, 2007 to Feb. 28, 2007 (109 total pages). Online discussion thread retrieved Feb. 4, 2014 at <http://www.ietf.org/mail-archive/web/enum/current/thrd3.html>.

* cited by examiner

METHODS AND APPARATUS TO ROUTE A COMMUNICATION SESSION DIRECTLY TO A VOICEMAIL MAILBOX

FIELD OF THE DISCLOSURE

This disclosure relates to generally telephone networks and, more particularly, to methods and apparatus to route a communication session directly to a voicemail mailbox.

BACKGROUND

In communication networks, such as Internet Protocol Multimedia Subsystem networks, communication sessions are routed through a communication network from an originating device (e.g., a voice over internet protocol telephone and/or public switched telephone network telephone) to a terminating device (e.g., a voice over internet protocol telephone and/or a public switched telephone network telephone). If the terminating device is busy or a communication session between the originating device and the terminating device is not initiated, the communication session is transferred to a voicemail mailbox associated with the terminating device at a voicemail server. The originating device then has an opportunity to leave a message (e.g., a voice message) in the voicemail mailbox.

DETAILED DESCRIPTION

Figure 1:
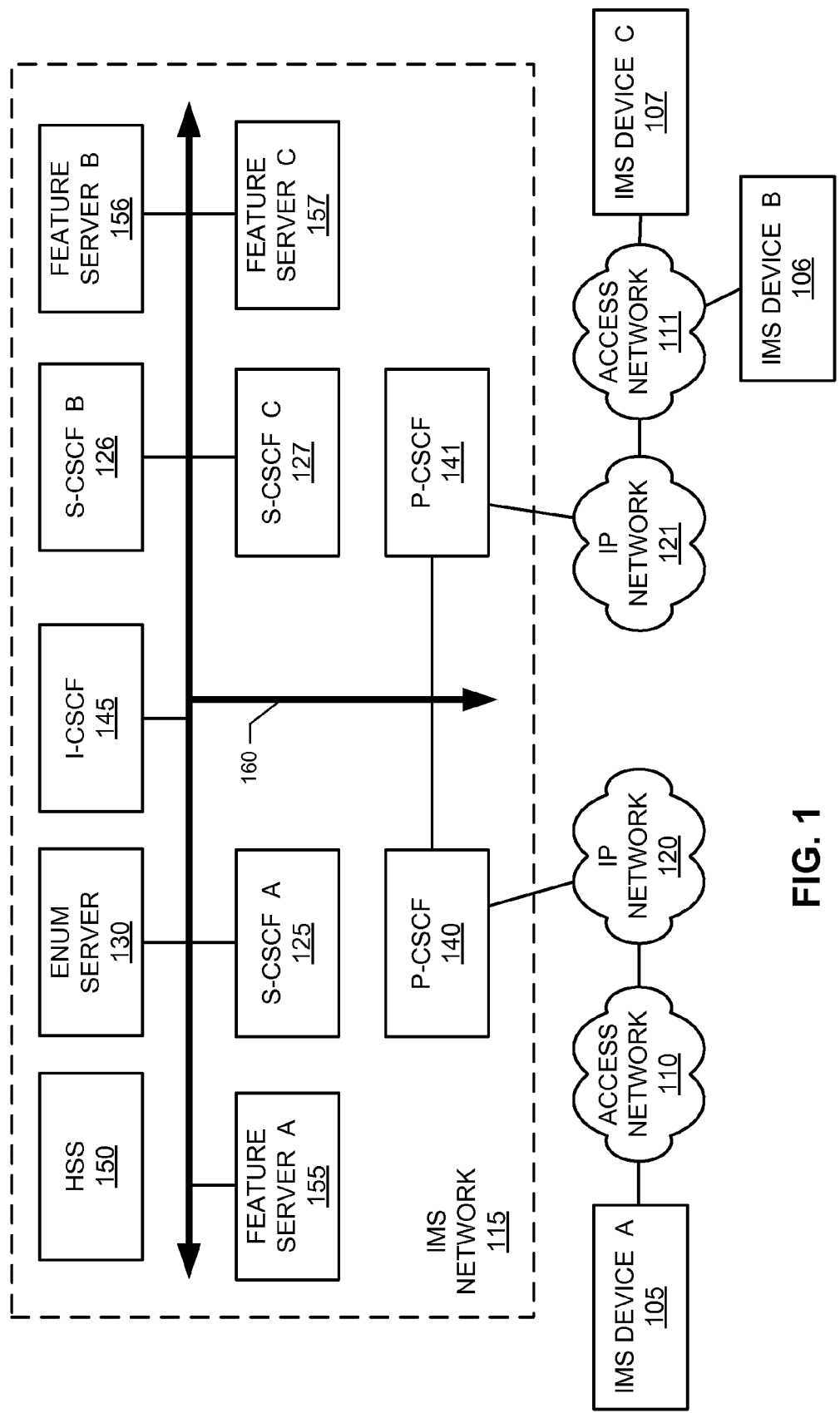
FIG. 1 is a schematic illustration of an example Internet Protocol Multimedia Subsystem based communication system constructed in accordance with the teachings of the disclosure.

FIG. 1 is a schematic illustration of an example system for routing communication sessions. In the illustrated example, a caller at an originating communication device can request that an initiated communication session be directed to a voicemail server, rather than first being directed to a terminating device. In the illustrated example, a user dials "*99" followed by the number of a terminating device. The system illustrated in FIG. 1 is capable of receiving the request for call-directed voicemail, determining the location of a voicemail server associated with a voicemail mailbox of the terminating device, and forwarding the communication session to the voicemail server without first ringing the terminating device.

FIG. 1 is a schematic illustration of an example Internet Protocol (IP) Multimedia Subsystem (IMS) communication system that includes any number and/or type(s) of IMS devices, three of which are designated at reference numerals 105, 106 and 107. Example IMS devices 105-107 include, but are not limited to, an IMS (e.g., a voice over internet protocol phone (VoIP)) phone, an IMS residential gateway, an IMS enabled personal computer (PC), an IMS endpoint, a wireless IMS device (e.g., a wireless-fidelity (WiFi) IP phone), an IMS adapter (e.g., an analog telephone adapter (ATA)), an IMS enabled personal digital assistant (PDA), and/or an IMS kiosk. The example IMS devices 105-107 of FIG. 1 may be implemented and/or found at any number and/or type(s) of locations. Further, the IMS devices 105-107 may be fixed location devices, substantially fixed location devices and/or mobile devices. Moreover, the IMS devices 105-107 may have equipment communicatively and/or electrically coupled to them. For example, an IMS ATA may be coupled to a telephone, and/or an IMS residential gateway may be coupled to a PC and/or set-top box.

To access IMS communication services throughout and/or within a site, location, building, geographic area and/or geographic region, the example IMS communication system of FIG. 1 includes any number and/or type(s) of access networks, two of which are designated in FIG. 1 with reference numbers 110 and 111. In general, the example access networks 110 and 111 provide and/or facilitate a communicative coupling of the IMS devices 105-107 to and/or with an IMS network 115, which provides and/or enables IMS communication services to the IMS device 105-107. However, in some examples, one or more of the IMS devices 105-107 may access the IMS network 115 without use of an access network 110, 111. The example access networks 110 and 111 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, each of the example IMS devices 105-107 are depicted as having an associated access network 110, 111, such depictions are merely illustrative. For example, the example IMS devices 105-107 may utilize a common access network 110, 111, an IMS device 105-107 may be configured for and/or capable of utilizing more than one access network 110, 111 at the same and/or different times, an IMS device 105-107 may be configured to access the IMS network 115 directly or via the IP network 120 without an intervening access network 110, etc.

To provide IMS communication services (e.g., telephone services, Internet services, data services, messaging services, instant messaging services, electronic mail (email) services, chat services, video services, audio services, gaming services, etc.), the example IMS communication system of FIG. 1 includes one or more IMS networks, one of which is designated in FIG. 1 with reference numeral 115. In IMS networks, such as the example IMS network 115 of FIG. 1, a tElephone NUMber mapping (ENUM) server (e.g., an example ENUM server 130) is generally used to obtain a session initiation protocol (SIP) uniform resource identifier (URI) for a destination based on the telephone number associated with the destination. The SIP URI is then used by and/or within the IMS network 115 to route a communication session to the destination.

In the example IMS communication system of FIG. 1, the example IMS devices 105-107 are communicatively coupled to the example IMS network 115 via one or more of the example access networks 110 and/or 111, and/or any number and/or type(s) of private and/or public IP based communication networks such as, for example, the Internet, two of which are illustrated in FIG. 1 with reference numerals 120 and 121. While in the illustrated example of FIG. 1, each of the example IMS devices 105-107 are depicted as having an associated IP network 120, 121, such depictions are merely illustrative. For example, the example IMS devices 105-107 may utilize the same public IP network, an IMS device 105-107 may be configured for and/or capable of utilizing more than one IP network 120, 121 at the same and/or different times, etc. In general, the example IP networks 120 and 121 of FIG. 1 provide and/or facilitate a communicative coupling of the IMS devices 105-107 to and/or with the IMS network 115.

In some examples, the IMS devices 105-107 may be communicatively coupled to the access networks 110 and 111 via one or more additional IP based networks and/or devices (not shown), such as a local area network (LAN), a gateway and/or a router located within a place of business, a school and/or a residence. The example IMS devices 105-107 of FIG. 1 are communicatively coupled to the example access networks 110 and 111, the example IP networks 120 and 121 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example IMS devices 105-107 may be coupled to the example access networks 110 and 111, the example IP networks 120 and 121, and/or the example IMS network 115 via any type(s) of voiceband modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 4G wireless networks, etc. Moreover, any or all of the example IMS network 115, the example access networks 110 and 111, and/or the example IP networks 120 and 121 of FIG. 1 may extend geographically to include one or more locations near to and/or encompassing one or more of the IMS devices 105-107. For example, the access network 110 may include a wireless access point (not shown) by which, for example, a WiFi IP phone 105 connects to the IP network 120 and the IMS network 115.

In the example IMS communication system of FIG. 1, the example access networks 110 and 111, the example IP networks 120 and 121, and the IMS network 115 need not be owned, implemented, and/or operated by a single service provider. For example, the IMS devices 105-107 may access IMS services provided by an IMS network 115 owned, operated and/or implemented by a first service provider via access networks 110 and 111, which are owned, operated and/or implemented by one or more additional service providers. However, any or all of the access networks 110 and 111, the IMS network 115 and/or the IP networks 120 and 121 may be operated by a single service provider.

In the illustrated example IMS communication system of FIG. 1, each IMS device (e.g., the example IMS devices 105-107) that is registered to the example IMS network 115 is associated with and/or assigned to a serving-call session control function (S-CSCF) server (three of which are designated in FIG. 1 with reference numerals 125, 126 and 127). The example S-CSCF servers 125-127 of FIG. 1 are responsible for handling incoming and/or outgoing IMS communication sessions (e.g., telephone calls, data sessions and/or video sessions) associated with its registered IMS devices 105-107.

While three S-CSCF servers 125-127 are illustrated in FIG. 1, the IMS network 115 may include any number and/or type(s) of S-CSCF servers, and each such S-CSCF server may support any number and/or type(s) of IMS devices 105-107. The example S-CSCF servers 125-127 of FIG. 1 perform session control, maintain session states and/or enable communications with call feature servers (e.g., the example feature servers 155-157 of FIG. 1) for its associated and/or registered IMS devices 105-107. For instance, when the calling IMS device A 105 initiates, for example, an outgoing telephone call to the example IMS device B 106, a communication session initiation message (e.g., a SIP INVITE message) is routed by the IMS network 115 from the IMS device A 105 to the S-CSCF server A 125 associated with that particular IMS device A 105. When the calling IMS device A 105 initiates an outgoing telephone call having a destination that includes a feature identifier (e.g., "*99), the S-CSCF server A 125 routes the communication session initiation message to a feature server (e.g., the feature server A 155) for processing.

To provide one or more additional call features, the example IMS network 115 of FIG. 1 includes any number and/or type(s) of feature servers, three of which are designated in FIG. 1 with reference numerals 155, 156 and 157. The example feature servers 155-157 of FIG. 1 provide and/or implement additional service features to subscribers (e.g., call barring, calling name delivery and/or blocking, call blocking, call forward, call forking, call trace, voicemail, announcement servers, call trees, etc.). Example feature servers 155-157 include, but are not limited to, VoIP feature servers. The feature servers 155-157 may be used to provide and/or implement call features and/or services for both calling and/or called parties.

According to the illustrated example, the feature server A 155 supports a direct-to-voicemail feature. When a communication session initiation message having a destination that includes a direct-to-voicemail feature identifier is routed to the feature server A 155 from the S-CSCF server A 125, the feature server A modifies the communication session initiation message to direct the call to a callee's voicemail. In the example implementation, the example feature server A 155 sends an ENUM query to the ENUM server 130 requesting URIs associated with the destination identified in the communication session initiation message. Upon receipt of the URIs from the ENUM server 130, the feature server selects a URI associated with a voicemail server. The feature server A 155 then inserts the original destination number in a header field used to indicate a redirecting number. According to the illustrated example, the feature server A 155 inserts the destination number in a Redirecting Number field in a Diversion Header of the communication session initiation message. The feature server A 155 also inserts an identifier in the communication session initiation message indicating that the communication session initiation message is being directed to voicemail based on a caller request. In the illustrated example, the feature server A 155 inserts a reason code identifying "caller-requested" in the Diversion Header of the communication session initiation message. The feature server A 155 additionally adds a parameter to the communication session initiation message indicating that a S-CSCF that receives the communication session initiation message doesn't need to perform another ENUM query. For example, appending the parameter "term" to a route header of the communication session initiation message indicates to the S-CSCF A 125 that an ENUM query has already been performed and does not need to be repeated.

After modifying the communication session initiation message, the feature server A 155 routes the communication session initiation message to the S-CSCF A 155 for processing.

In another example implementation, the feature server A 155 may alternatively not perform an ENUM query. Upon receipt of a communication session initiation message, the example feature server A 155 removes the direct-to-voicemail feature identifier from the destination of the communication session initiation message and copies the destination to a redirecting number field of the communication session initiation message. The example feature server A 155 also appends a tag to the communication session initiation message indicating that the caller has requested connection directly to the callee's voicemail (e.g., "CTag: Voicemail Direct"). The example feature server A 155 modifies a header of the communication session initiation message to include a reason code that identifies the reason for forwarding the call directly to voicemail (e.g., "caller-requested"). The feature server then routes the communication session initiation message back to the S-CSCF server A 125. According to this example implementation, the feature server A 155 does not perform an ENUM query. Rather, the S-CSCF server A 125 will perform the ENUM query upon receipt of the communication message initiation message.

The feature server B 156 of the illustrated example is associated with a voicemail mailbox of the IMS device B 106. For example, calls that are not answered at the IMS device B 106 are normally routed to the feature server B 156 so that a caller can leave a voicemail message. The example feature server B 156 additionally handles incoming calls that identify "caller-requested" in the Diversion Header of the communication session initiation message differently than other incoming calls (e.g., calls that were directed to voicemail as a result of a call not being answered by a callee). For example, the feature server B 156 may present an incoming call with a different outgoing message that may have been customized by a callee, may present the caller with an interactive voice response menu that is different from a menu offered to traditional voicemail calls, etc.

If an ENUM query has been performed by the feature server A 155, the S-CSCF server A 125 receives the communication session initiation message and does not perform an additional ENUM query. In the illustrated example, the "term" parameter indicates to the S-CSCF server A 125 that a further ENUM query is not needed. Based on the URI identified in the communication session initiation message (e.g., the URI of the voicemail server), the S-CSCF server A 125 determines if the voicemail server is located on a PSTN network or a VoIP network. According to the illustrated example, the URI identifies the network as "tel" indicating a PSTN network or "sip" indicating a VoIP network. If the voicemail server is on a PSTN network, the S-CSCF server A 125 routes the communication session to the voicemail server on the PSTN network. If the voicemail server is on a VoIP network, the S-CSCF server A 125 performs a domain name service (DNS) query on a domain name of the URI in the communication session initiation message to obtain an IP address of the voicemail server. An example URI identifies user@voicemail.server.com. The S-CSCF performs a DNS query on the domain name voicemail.server.com to obtain an IP address for the server. Once an IP address of the voicemail server has been obtained, the S-CSCF server A 125 routes the communication session to the IP address of the voicemail server.

If an ENUM query has not been performed by the feature server A 155, the example S-CSCF server A 125 sends an ENUM query request message to the example ENUM server 130 to obtain an identifier (e.g., a SIP URI) for the voicemail server associated with the destination of the communication session initiation message (e.g., feature server B 156). According to the illustrated example, the ENUM server 130 returns an identifier (e.g., a SIP VOICEMAIL URI) for the feature server B 156, which manages the voicemail mailbox for the callee identified in the communication session initiation message. The S-CSCF server A 125 recognizes the tag appended to the communication session initiation message (e.g., "CTag: Voicemail Direct") by the feature server. In response to recognizing the appended tag, the S-CSCF server A uses the VOICEMAIL URI for processing the communication session initiation message. The S-CSCF server routes the call to the feature server identified by the VOICEMAIL URI (e.g., feature server B 156) as a standard "Message Deposit" call. For example, the call will be routed as if the call had been sent to the callee and not answered.

To locate and/or identify the destination for a requested communication session (e.g., a communication session directed to a voicemail server), the example IMS network 115 of FIG. 1 includes any number of ENUM servers, one of which is designated in FIG. 1 with reference numeral 130. The example ENUM server 130 of FIG. 1 extracts the call destination from the ENUM query request message received from an S-CSCF server 125-127. The example ENUM server 130 then performs, based on the destination, a lookup of an ENUM database (e.g., the example ENUM database 220 of FIG. 2) to obtain a SIP URI for the final destination. The ENUM database stores and/or represents associations between device identifiers (e.g., E.164 telephone numbers to SIP URIs). Thus, for example, by performing an ENUM lookup, a SIP URI (e.g., a fully qualified domain name) for the destination can be identified based upon a called telephone number assigned to the destination. However, the ENUM database may store any number and/or type(s) of associations between any number and/or type(s) of identifiers. In some examples, a final destination associated with and/or configured to an original destination may already be a URI (e.g., a SIP URI, an application URI and/or a hypertext transfer protocol (HTTP) URI) and, thus, the ENUM database lookup need not be performed. An example manner of implementing the example ENUM server 130 is described below in connection with FIG. 2.

The ENUM server 130 of the illustrated stores and retrieves a URI for a voicemail mailbox. An example ENUM service for a voicemail server includes an Enumersevice Name field that is populated with "vm", an Enumerservice Type field populated with "vm", an Enumservice Subtype field populated with "tel" or "sip", and a URI Scheme field populated with "tel" or "sip." In the example implementation, the "tel" identifier is used when the voicemail system resides in a public switched telephone network (PSTN) and the "sip" identifier is used when voicemail system resides in a VoIP network. The ENUM server may use any identification to identify the voicemail mailbox. In the illustrated example, the voicemail mailbox is identified as "mailbox voicemail.server.com."

To provide an access entry point for an IMS device 105-107 into the IMS network 115, the example IMS network 115 of FIG. 1 includes any number and/or type(s) of proxy call session control function (P-CSCF) servers, two of which are designated in FIG. 1 with reference numerals 140 and 141. The example P-CSCF servers 140 and 141 of FIG. 1, among other things, route SIP messages between IMS devices 105-107 and their associated S-CSCF servers 125-127.

To locate and/or identify the S-CSCF server 125-127 associated with an IMS device 105-107, the example IMS network 115 of FIG. 1 includes any number and/or type(s) of interrogating call session control function (I-CSCF) servers, one of which is designated in FIG. 1 with reference number 145. The example I-CSCF server 145 of FIG. 1 serves as a contact point within the example IMS network 115 for connections destined for an IMS device 105-107 of the IMS communication system, and/or for an IMS device 105-107 currently located within the serving area of the IMS communication system (e.g., a roaming subscriber). For example, for a destination identified by the example ENUM server 130, the example I-CSCF 145 identifies to which S-CSCF server 125-127 the destination IMS device 105-107 is registered. IMS protocol messages directed to the destination IMS device 105-107 are then routed to the S-CSCF server 125-127 identified by the I-CSCF 145.

To manage subscriber information, and/or to enable subscribers and/or servers to locate other servers, subscribers and/or destinations, the example IMS network 115 of FIG. 1 includes any number and/or type(s) of home subscriber server(s) (HSSs), one of which is designated in FIG. 1 with reference numeral 150. The example HSS 150 of FIG. 1 maintains a device profile and/or one or more preferences for each subscriber and/or IMS device 105-107 of the IMS network 115. The example I-CSCF server 145 of FIG. 1 uses information contained in the HSS 150 to, for example, determine and/or locate the S-CSCF server 125-127 associated with a particular subscriber and/or IMS device 105-107.

As illustrated in FIG. 1, the example S-CSCF servers 125-127, the example ENUM server 130, the example P-CSCF servers 140 and 141, the example I-CSCF server 145, the example HSS 150, and/or the example feature servers 155-157 communicate and/or are communicatively coupled via any number, type(s) and/or combination of communication paths, communication networks, busses and/or communication devices 160.

While an example IMS communication system, example IMS devices 105-107, and an example IMS network 115 have been illustrated in FIG. 1, the devices, networks, systems, servers and/or processors illustrated in FIG. 1 may be combined, divided, re-arranged, eliminated and/or implemented in any way. The example S-CSCF servers 125-127, the example ENUM server 130, the example P-CSCF servers 140 and 141, the example I-CSCF server 145, the example HSS 150, and/or the example feature servers 155-157 illustrated in FIG. 1 are logical entities of the example IMS network 115. They may, therefore, be implemented separately and/or in any combination using, for example, machine accessible instructions executed by one or more computing devices and/or computing platforms. Further, the example IMS devices 105-107, the example S-CSCF servers 125-127, the example ENUM server 130, the example P-CSCF servers 140 and 141, the example I-CSCF server 145, the example HSS 150, the example feature servers 155-157 and/or, more generally, the example IMS network 115 may be implemented by hardware, software, firmware and/or any combination of hardware, software and/or firmware. Further still, the example IMS communication system, the example IMS devices 105-107 and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 115 may include any number and/or type(s) of media gateways, media gateway control function (MGCF) servers, breakout gateway control function (BGCF) severs and/or session border controllers.

Figure 2:
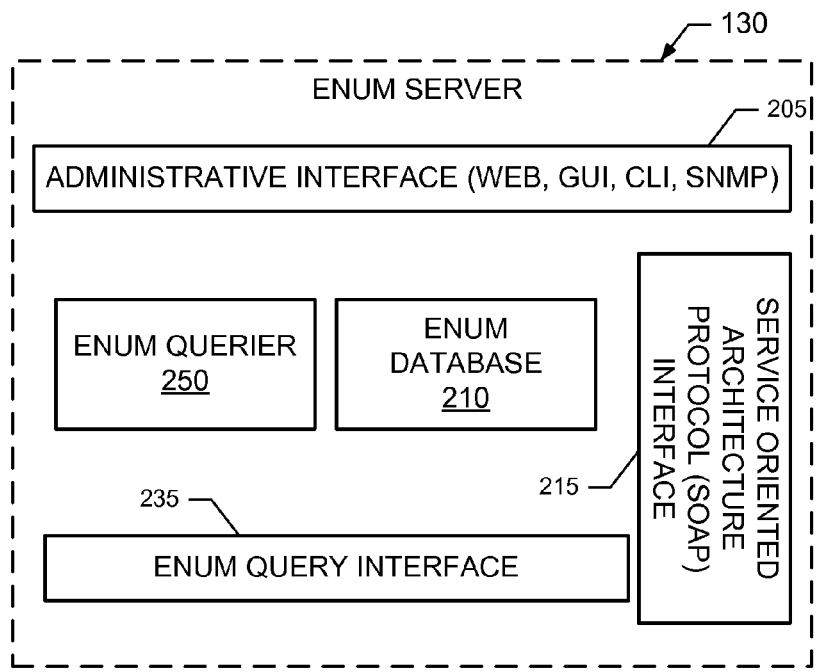
FIG. 2 illustrates an example manner of implementing the example telephone number mapping (ENUM) server of FIG. 1.

FIG. 2 illustrates an example manner of implementing the example ENUM server 130 of FIG. 1. To allow the example ENUM server 130 of FIG. 2 to be administered, the example ENUM server 130 includes any type of administrative interface 205. The example administrative interface 205 of FIG. 2 may be implemented by one or more of a command-line interface (CLI), a graphical user interface (GUI), a web-based interface, and/or a simple network management protocol (SNMP) interface. The example administrative interface 205 may be used to remotely administer and/or configure the example ENUM server 130, and/or to configure and/or load an ENUM database 210 used to perform ENUM lookups.

To allow feature servers (e.g., the example feature servers 155-157 of FIG. 1) to configure, update and/or otherwise provide re-direction information and/or data, the example ENUM server 130 of FIG. 1 includes a service oriented architecture protocol (SOAP) interface 215. In other examples, the interface 215 may be implemented using an open application programming interface (API) such as, for example, JAVA and/or common object request broker architecture (CORBA).

The example ENUM database 210 may be implemented using any number and/or type(s) of data structures, and may be stored in and/or within any number and/or type(s) of memories and/or memory devices 230.

To allow call servers (e.g., the example S-CSCF servers 125-127 of FIG. 1) to perform ENUM queries, the example ENUM server 130 of FIG. 2 includes any type of ENUM query interface 235. Using any message(s), format(s) and/or protocol(s) (e.g., in accordance with Internet Engineering Task Force (IETF) Request for Comment (RFC) 4761), the example ENUM query interface 235 of FIG. 2 exchanges ENUM query request messages and ENUM query response messages with call servers.

To perform ENUM lookups, the example ENUM server 130 of FIG. 2 includes any type of example ENUM querier 250. The example ENUM querier 250 of FIG. 2 performs a lookup of the ENUM database 210 to identify a SIP URI associated with a telephone number. In some examples, the ENUM database 210 is implemented using one or more legacy ENUM servers.

While an example manner of implementing the example ENUM server 130 of FIG. 1 has been illustrated in FIG. 2, one or more of the data structures, elements, processes and/or devices illustrated in FIG. 2 may be combined, divided, re-arranged, omitted, eliminated and/or implemented in any other way. Further, the example interfaces 205, 215 and 235, the example databases 210, the example ENUM querier 250 and/or, more generally, the example ENUM server 130 may be implemented by hardware, software, firmware and/or any combination of hardware, software and/or firmware. Further still, the example ENUM server 130 may include data structures, elements, processes and/or devices instead of, or in addition to, those illustrated in FIG. 2 and/or may include more than one of any or all of the illustrated data structures, elements, processes and/or devices.

Figure 3:
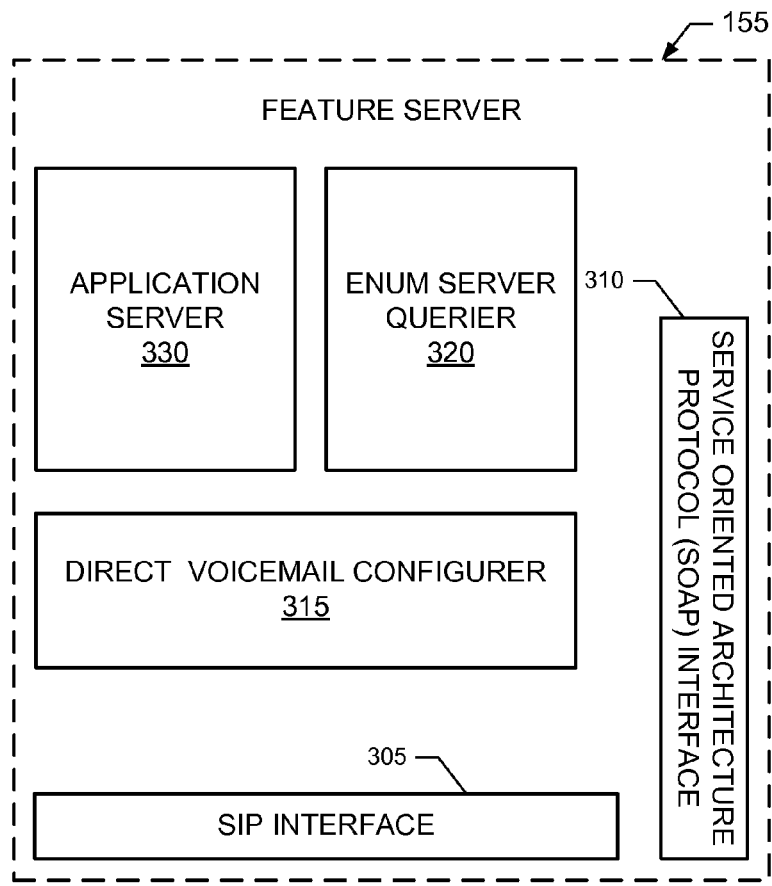
FIG. 3 illustrates an example manner of implementing any or all of the example feature servers of FIG. 1

FIG. 3 illustrates an example manner of implementing any or all of the example feature servers 155-157 of FIG. 1. While any or all of the example feature servers 155-157 of FIG. 1 may be represented by FIG. 3, for ease of discussion, the device of FIG. 3 will be referred to as feature server 155. To allow the example feature server 155 of FIG. 3 to operate as a SIP feature server that supports callers being directed to a callee's voicemail, the example feature server 155 includes a SIP interface 305. The example SIP interface 305 of FIG. 3 allows the feature server 155 to exchange (e.g., send and/or receive) any type of SIP messages with other device(s) and/or server(s) of the example IMS communication system of FIG. 1 (e.g., any of the example S-CSCF servers 125-127).

To allow the example feature server 155 of FIG. 3 to handle communication session initiation message having a destination including a feature identifier, the example feature server 155 includes a direct voicemail configurer 315 and the ENUM server querier 320. The direct voicemail configurer 315 receives a communication session initiation message forwarded from an S-CSCF server (e.g., the S-CSCF server A 125 of FIG. 1) that is a direct to voicemail request. The direct voicemail configurer 315 extracts the destination number (e.g., called number) from the communication session initiation message and directs the ENUM server querier 320 to query an ENUM server (e.g., the ENUM server 130 of FIG. 1) to request a URI associated with the destination number. Upon receipt of the ENUM list of URIs associated with the destination number from the ENUM server, the direct voicemail configurer 315 selects the voicemail URI. The direct voicemail configurer 315 inserts the original dialed number into a header of the communication session initiation message. The direct voicemail configurer 312 also inserts a new reason code (e.g., "caller-requested") as the reason for forwarding into a header of the message. In addition, the direct voicemail configurer 312 replaces the URI (e.g., the Request-URI) that it received from the caller with the voicemail URI from the returned ENUM list. The direct voicemail configurer 315 of the illustrated example additionally appends a parameter to a header of the communication session initiation message (e.g., in the illustrated example, the parameter "term" is appended to the Route header) to instruct the S-CSCF server not to perform an addition ENUM query once the communication session initiation message is directed back to the S-CSCF server.

To implement call services and/or features, the example feature server 155 of FIG. 3 includes any number and/or type(s) of application servers, one of which is designated at reference numeral 330. The example application server 330 of FIG. 3 implements any call services and/or features such as, for example, call barring, call name delivery, call name blocking, call blocking, call forwarding, call forking, call trace, and/or voicemail.

While an example manner of implementing any or all of the example feature servers 155-157 of FIG. 1 has been illustrated in FIG. 3, one or more of the data structures, elements, processes and/or devices illustrated in FIG. 3 may be combined, divided, re-arranged, omitted, eliminated and/or implemented in any other way. Further, the example interfaces 305 and 310, the example ENUM server querier 320, the example direct voicemail configurer 315, the example application server 330 and/or, more generally, the example feature servers 155-177 may be implemented by hardware, software, firmware and/or any combination of hardware, software and/or firmware. Further still, the example feature servers 155-157 may include data structures, elements, processes and/or devices instead of, or in addition to, those illustrated in FIG. 3 and/or may include more than one of any or all of the illustrated data structures, elements, processes and/or devices.

Figure 4:
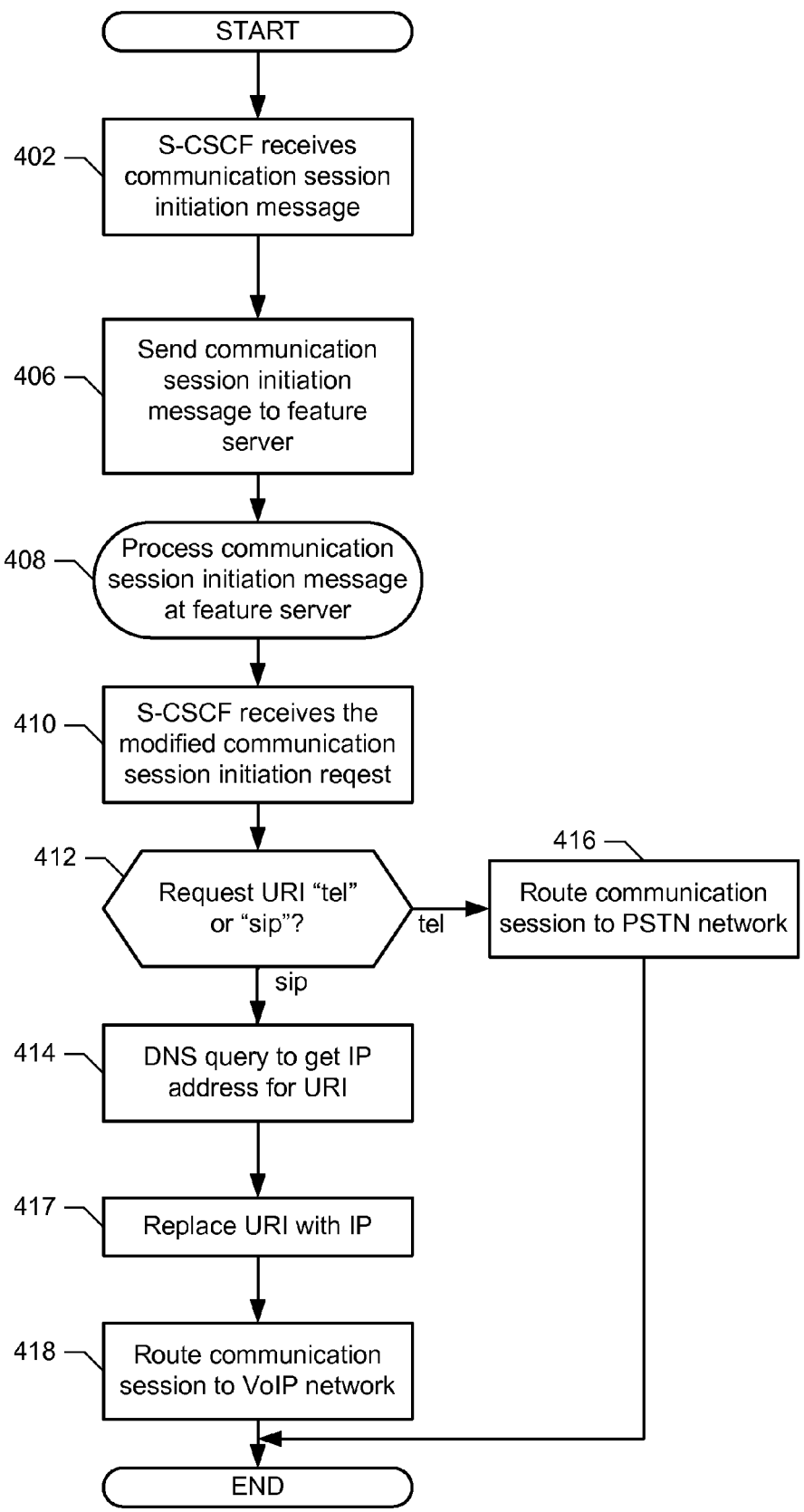
FIG. 4 is a flowchart illustrating example machine readable instructions that are executed to forward a communication session directly to a voicemail mailbox.
Figure 5:
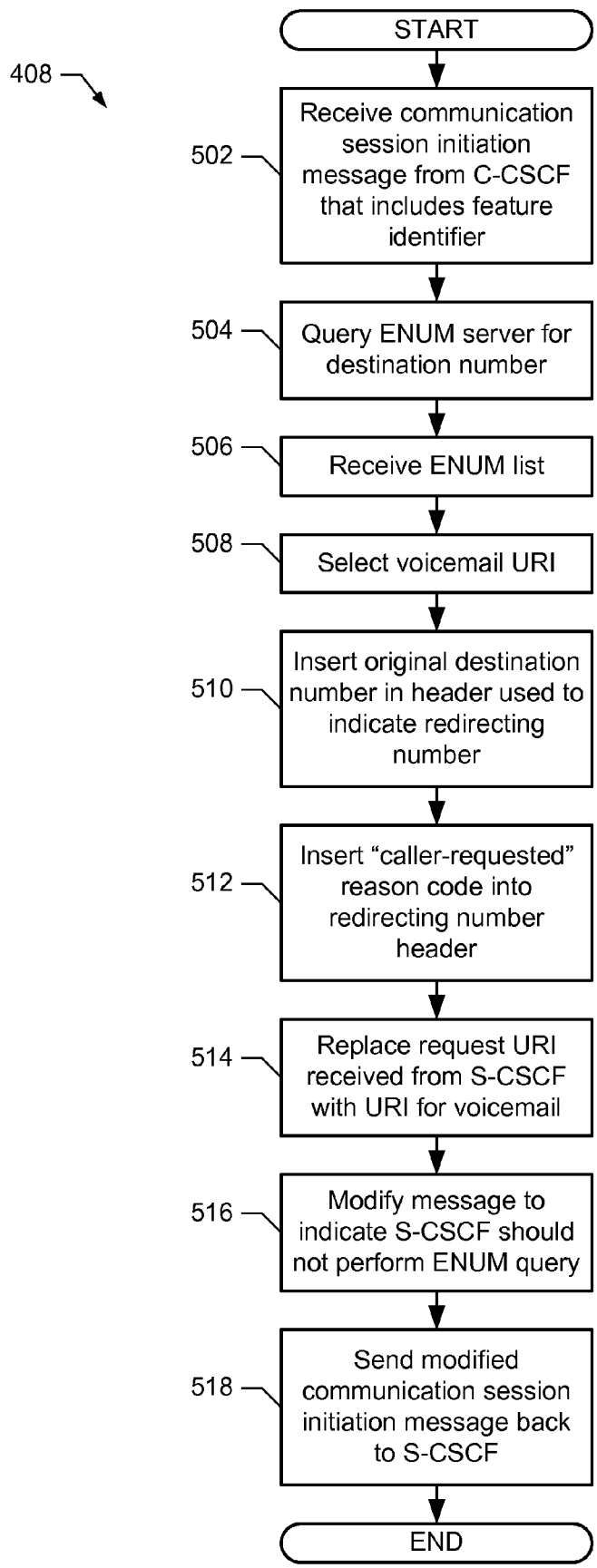
FIG. 5 is a flowchart illustrating example machine readable instructions that are executed to implement the feature server of FIG. 1.

FIGS. 4-5 illustrate example machine accessible instructions that are executed to implement any or all of the example S-CSCF server A 125 of FIGS. 1 and 2 and the example feature server A of FIGS. 1 and 4. The example machine accessible instructions of FIGS. 4 and/or 5 may be carried out by a processor, a controller and/or any other suitable processing device. For example, the example machine accessible instructions of FIGS. 4 and/or 5 may be embodied in coded instructions stored on a tangible medium such as a flash memory, a read only memory (ROM) and/or random access memory (RAM) associated with a processor (e.g., the example processor 1005 discussed below in connection with FIG. 6). Alternatively, some or all of the example machine accessible instructions of FIGS. 4 and/or 5 may be implemented using any combination(s) of application-specific integrated circuit(s) (ASIC), programmable logic device(s) (PLD), field-programmable logic device(s) (FPLD), discrete logic, hardware, firmware, etc. Also, some or all of the example machine accessible instructions of FIGS. 4 and/or 5 may be implemented manually or as any combination of any of the foregoing techniques, for example, any combination of firmware, software, discrete logic and/or hardware. Further, although the example machine accessible instructions are described with reference to the flowcharts of FIGS. 4 and 5, many other methods of implementing the machine accessible instructions of FIGS. 4 and/or 5 may be employed. For example, the order of execution of the blocks may be changed, and/or one or more of the blocks described may be changed, eliminated, sub-divided, or combined. Additionally, any or all of the example machine accessible instructions of FIGS. 4 and/or 5 may be carried out sequentially and/or carried out in parallel by, for example, separate processing threads, processors, devices, discrete logic, circuits, etc.

The flowchart of FIG. 4 begins when a communication session initiation message is received by a S-CSCF server (e.g., the S-CSCF server A 125 of FIG. 1) (block 402). For example, the IMS device A 105 sends a communication session initiation message to the P-CSCF 140, which identifies the S-CSCF server (e.g., the S-CSCF A 125) associated with a destination identified in the communication session initiation message (e.g., the S-CSCF A 125). The P-CSCF 140 routes the communication session initiation message to the S-CSCF A 125. The communication session initiation message is routed to a feature server (e.g., the feature server A 155 of FIG. 1) (block 406). The feature server then processes the communication session initiation message (block 408). A flowchart illustrating an example implementation of the processing performed by the feature server in block 408 is illustrated in FIG. 5.

After the communication session initiation message is processed by the feature server, the S-CSCF receives a modified communication session initiation message from the feature server (block 410). In the illustrated example, the modified communication session initiation message identifies a URI for a voicemail server associated with the destination identified in the communication session initiation message. Then, the S-CSCF determines if the URI identified in the modified communication session initiation message indicates that the voicemail server is on a PSTN or a VoIP network (block 412). In the illustrated example, the uniform resource locator includes the identifier "tel" if the voicemail server is on a PSTN or includes the identifier "sip" if the voicemail server is on a VoIP network. Alternatively, if additional communication networks exist, an identifier for the additional networks may be used.

If the URI indicates that the voicemail server is on a PSTN network (block 412), the S-CSCF routes the communication session to the voicemail server on the PSTN network (block 416). In the illustrated example, the communication session is routed directly to the voicemail mailbox associated with the destination of the communication session initiation message so that the caller can leave a message in the voicemail mailbox without ringing the telephone of the destination. The instructions represented FIG. 4 is then complete.

Returning to block 418, if the URI indicates that the voicemail server is on a VoIP network (block 412), the S-CSCF performs a DNS query using the domain name identified in the URI to obtain an IP address associated with the voicemail server (block 414). The S-CSCF replaces the domain name identified in the URI with the IP address retrieved by the DNS query (block 417). The S-CSCF then routes the communication session to the IP address identified by the DNS query (block 418). The instructions represented by the flowchart of FIG. 4 then terminate.

While the instructions of FIG. 4 are completed once the communication session initiation message has resulted in a communication session being routed to a voicemail server, it should be understood that the instructions may be implemented as a loop that waits for a next communication session initiation message (e.g., control returns to block 402).

The flowchart of FIG. 5 illustrates example machine readable instructions that are executed to process a communication session initiation message at a feature server (block 408 of FIG. 4). The flowchart of FIG. 5 begins when a communication session initiation message is received from a S-CSCF (e.g., the S-CSCF A 125 of FIG. 1) at a feature server (e.g., the feature server A 155 of FIG. 1) (block 502). The example communication session initiation message identifies a destination that includes a feature identifier indicating that the source of the communication session has requested to be connected directly to a voicemail mailbox at the destination. In response, the feature server sends a query to an ENUM server (e.g., the ENUM server 130 of FIG. 1) for a destination number identified in the communication session initiation message (block 504). In response, the feature server receives an ENUM list identifying URIs associated with the destination number (block 506). Because the destination of the communication session initiation indicates that the communication session is to be connected directly to a voicemail mailbox, the feature server selects a URI for the voicemail server from the ENUM list (block 508). The feature server then inserts the destination number from the communication session initiation message in a header of the communication session initiation message used to indicate a redirecting number (block 510). In the illustrated example, the destination number field is inserted in a field in a Diversion Header of the communication session initiation message. The feature server then inserts a "caller-requested" reason code into the header (e.g., the Diversion Header) of the communication session initiation message (block 512). Next, the feature server replaces the URI identified in the communication session initiation message with the URI associated with the voicemail server from the ENUM list (block 514). Then, the feature server modifies the communication session initiation message to indicate that an ENUM query has been performed (block 516). In the illustrated example, the feature server adds the parameter "term" to a route header of the communication session initiation message to indicate to a S-CSCF server that a further ENUM query need not be performed.

After the feature server has modified the communication session initiation message, the feature server sends the modified communication session initiation message back to the S-CSCF (block 518). Control then returns to block 410 of FIG. 4.

Figure 6:
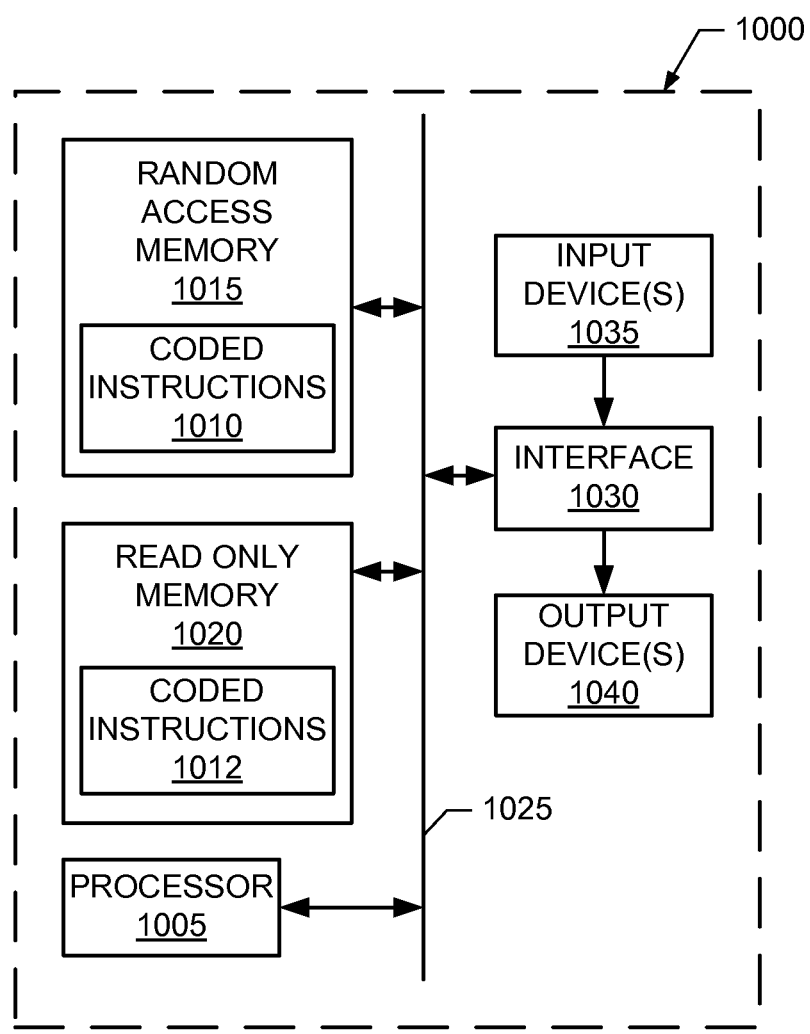
FIG. 6 is a schematic illustration of an example processor platform that is used and/or programmed to carry out the example message exchanges and/or the example machine accessible instructions of FIGS. 4 and/or 5 to implement any of all of the example methods and apparatus described herein.

FIG. 6 is a schematic diagram of an example processor platform 1000 that may be used and/or programmed to implement all or a portion of any or all of the example S-CSCF servers 125-127, the example ENUM servers 130, the example feature servers 155-157 and/or, more generally, the example IMS network 115 of FIGS. 1-3. For example, the processor platform 1000 can be implemented by one or more general purpose processors, processor cores, microcontrollers, etc.

The processor platform 1000 of the example of FIG. 6 includes at least one general purpose programmable processor 1005. The processor 1005 executes coded instructions 1010 and/or 1012 present in main memory of the processor 1005 (e.g., within a RAM 1015 and/or a ROM 1020). The processor 1005 may be any type of processing unit, such as a processor core, a processor and/or a microcontroller. The processor 1005 may execute, among other things, the example exchanges and/or the example machine accessible instructions of FIGS. 4-5 to implement the example methods and apparatus described herein.

The processor 1005 is in communication with the main memory (including a ROM 1020 and/or the RAM 1015) via a bus 1025. The RAM 1015 may be implemented by DRAM, SDRAM, and/or any other type of RAM device, and ROM may be implemented by flash memory and/or any other desired type of memory device. Access to the memory 1015 and 1020 may be controlled by a memory controller (not shown).

The processor platform 1000 also includes an interface circuit 1030. The interface circuit 1030 may be implemented by any type of interface standard, such as an external memory interface, serial port, general purpose input/output, etc. One or more input devices 1035 and one or more output devices 1040 are connected to the interface circuit 1030. The input devices 1035 and/or output devices 1040 may be used to, for example, implement the example interface 205, 215 and/or 235 of FIG. 2, and/or the example interfaces 305 and/or 310 of FIG. 3.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for handling voice over internet protocol telephone calls, the method comprising:
    receiving a communication session initiation message for a voice over internet protocol call from a caller at a source telephone number, the communication session initiation message including a destination telephone number and a direct voicemail feature identifier;
    determining that the direct voicemail feature identifier indicates that the caller requests that the call be sent directly to a voicemail mailbox associated with the destination telephone number;
    requesting a uniform resource identifier (URI) associated with the destination telephone number from a telephone number (ENUM) server;
    in response to the requesting, receiving from the ENUM server a list of URIs associated with the destination telephone number, wherein the list of URIs includes indications of service names and service types;
    selecting a voicemail URI from the list, wherein the voicemail URI in the list of URIs includes a service name indicating voicemail and a service type indicating voicemail;
    replacing a uniform resource locator of the communication session initiation message with the voicemail URI; and
    forwarding the call directly to the voicemail mailbox associated with the destination telephone number without ringing the destination telephone number, by:
        inserting the destination telephone number in a redirecting number field; and
        replacing content of a destination field with an identifier associated with a voicemail server containing the voicemail mailbox.

2. The method as defined in claim 1, wherein the communication session initiation message is a session initiation protocol (SIP) request.

3. The method as defined in claim 2, wherein a destination field of the SIP request contains the feature identifier appended to the destination telephone number.

4. The method as defined in claim 1, further comprising inserting the destination telephone number in a redirecting number field of the communication session initiation message, the redirecting number field identifying a location from which a call was redirected.

5. The method as defined in claim 4, further comprising inserting an identification in the communication session initiation message indicating that the caller requested that the call be directed to the voicemail associated with the destination telephone number.

6. The method as defined in claim 5, wherein the identification is inserted in a header of the communication session initiation message.

7. The method as defined in claim 6, wherein the header is a diversion header.

8. An apparatus comprising:
    a session initiation protocol (SIP) interface to receive a communication session initiation message for a voice over internet protocol call from a caller at a source telephone number, the communication session initiation message including a destination telephone number and a direct voicemail feature identifier;
    a direct voicemail configurer to determine that the direct voicemail feature identifier indicates that the caller requests that the call be sent to a voicemail mailbox associated with the destination telephone number; and
    a telephone number mapping (ENUM) querier to request a uniform resource identifier (URI) associated with the destination telephone number from a ENUM server, to receive from the ENUM server a list of URIs associated with the destination telephone number in response to the request, the list of URIs including indications of service names and service types, to select a voicemail URI from the list, and to replace a uniform resource locator of the communication session initiation message with the voicemail URI, the voicemail URI in the list of URIs including a service name indicating voicemail and a service type indicating voicemail,
    the direct voicemail configurer to forward the call directly to the voicemail mailbox associated with the destination telephone number without ringing the destination telephone number, by:
        inserting the destination telephone number in a redirecting number field,
        replacing content of a destination field with an identifier associated with a voicemail server containing the voicemail mailbox, and
        forwarding the communication session initiation message to a call session control function server.

9. The apparatus as defined in claim 8, wherein the communication session initiation message is a SIP request.

10. The apparatus as defined in claim 9, wherein a destination field of the SIP request contains the feature identifier appended to the destination telephone number.

11. The apparatus as defined in claim 8, wherein the direct voicemail configurer is further to insert the destination telephone number in a redirecting number field of the communication session initiation message, the redirecting number field identifying a location from which a call was redirected.

12. The apparatus as defined in claim 11, wherein the direct voicemail configurer is further to insert an identification in the communication session initiation message indicating that the caller requested that the call be directed to the voicemail associated with the destination telephone number.

13. The apparatus as defined in claim 12, wherein the identification is inserted in a header of the communication session initiation message.

14. A system comprising:
a call session control function server to receive a communication session initiation message for a voice over internet protocol call from a caller at a source telephone number and to forward the communication session initiation message, the communication session initiation message including a destination telephone number and a direct voicemail feature identifier; and
a feature server to:
  determine that the direct voicemail feature identifier of the communication session initiation message received from the call session control function server indicates that the caller requests that the call be sent to a voicemail mailbox associated with the destination telephone number;
  request a uniform resource identifier (URI) associated with the destination telephone number from a telephone number (ENUM) server;
  in response to the request, receive from the ENUM server a list of URIs associated with the destination telephone number, the list of URIs including indications of service names and service types;
  select a voicemail URI from the list, the voicemail URI in the list of URIs including a service name indicating voicemail and a service type indicating voicemail;
  replace a uniform resource locator of the communication session initiation message with the voicemail URI; and
  forward the call directly to the voicemail mailbox associated with the destination telephone number without ringing the destination telephone number, by:
    inserting the destination telephone number in a redirecting number field; and
    replacing content of a destination field with an identifier associated with a voicemail server containing the voicemail mailbox.

15. The system as defined in claim 14, wherein the communication session initiation message is a SIP request.

16. The system as defined in claim 15, wherein a destination field of the SIP request contains the feature identifier appended to the destination telephone number.

17. A tangible machine readable storage device comprising machine readable instructions that, when executed, cause a machine to perform operations comprising:
  accessing a communication session initiation message for a voice over internet protocol call from a caller, the communication session initiation message including a destination telephone number and a direct voicemail feature identifier;
  determining that the direct voicemail feature identifier indicates that the caller requests that the call be sent directly to a voicemail mailbox associated with the destination telephone number;
  requesting a uniform resource identifier (URI) associated with the destination telephone number from a telephone number (ENUM) server;
  selecting a voicemail URI from a list of URIs associated with the destination telephone number and received from the ENUM server, the list of URIs including indications of service names and service types, the voicemail URI on the list of URIs including a service name indicating voicemail and a service type indicating voicemail;
  replacing a uniform resource locator of the communication session initiation message with the voicemail URI; and
  forwarding the call directly to the voicemail mailbox associated with the destination telephone number without ringing a device at the destination telephone number, wherein the forwarding includes:
    inserting the destination telephone number in a redirecting number field; and
    replacing content of a destination field with an identifier associated with a voicemail server containing the voicemail mailbox.

18. The tangible machine readable storage device as defined in claim 17, wherein the communication session initiation message is a SIP request.

* * * * *